UNITED STATES PATENT OFFICE.

FRANZ SCHNELL, OF GUTENSTEIN, AUSTRIA-HUNGARY.

WOOD SUBSTITUTE.

No. 848,133.     Specification of Letters Patent.     Patented March 26, 1907.

Application filed September 20, 1906. Serial No. 335,482.

To all whom it may concern:

Be it known that I, FRANZ SCHNELL, a subject of the Emperor of Austria, residing at Gutenstein, in Lower Austria, have invented certain new and useful Improvements in Wood Substitutes, of which the following is a specification.

This invention relates to a new artificial composition that can be worked in the same manner as wood—that is to say, that can be cut, turned, polished, shaped, and fitted in any other manner and possesses in comparison with wood the advantage of being of a lower specific weight. This new composition consists of about equal parts of flour from cereals and of vegetable fibers or wood-dust with a small admixture of fibers of animal origin and a notable quantity of silicate of an alkali. The method of production of the said composition consists simply in intimately mixing the above-named ingredients under addition of a suitable quantity of water until at last a thick dough is obtained, from which doughy mass the desired articles can be shaped by pressing. After the pressing operation the articles are dried and then submitted to the above-mentioned finishing operations.

In practice the method of preparing the composition is carried out as follows: A quantity of flour from cereals nearly corresponding to one-half of the weight of the article that is to be manufactured is mixed with water so as to form a thick pulp, to which then wood-dust or vegetable fibers or animal fibers are admixed. As such fibers can be used wood fibers (cellulose) or the waste fibers obtained from spinning or animal-hair. As soon as the mass has become quite homogeneous the silicate of an alkali is admixed to the same. The quantitative relations of the separate ingredients to each other, as also their relation to the water contained in the pulp of the cereal-flour, should always be chosen in such a manner as to obtain finally a thick dough. This dough is thoroughly kneaded prior to the pressing operation of the articles that are to be made, so that after pressing and drying the composition assumes the aspect and the technical properties of wood.

While, as already mentioned, of the ingredients of the composition the flour of cereals and the vegetable fiber are taken in about equal proportions, by weight, and while these two substances, together with the silicate of an alkali, form by far the greatest part of the bulk of the composition, the percentage of the animal fiber is a great deal less. Satisfactory results are obtained with a composition consisting of forty parts, by weight, of flour of cereals with the corresponding quantity of water, forty parts, by weight, of vegetable fibers of wood-dust, two parts, by weight, of animal-hair, and eighteen parts, by weight, of water-glass.

The above-indicated composition serving as a substitute for wood is particularly appropriate for the manufacture of bobbins or spools, because it is of lighter weight than wood and besides possesses the properties required for the manufacture of spools, of being capable to be cut and smoothly polished.

It will be observed that in producing my wood substitute I do not incorporate in it any oils, varnishes, or lacquers, or other resinous or oily constituents.

I claim—

1. The method of making wood substitute which comprises forming a thick pulp of cereal-flour and water and mixing therewith a suitable fiber, adding a silicate of an alkali and kneading the same into a homogeneous dough, forming the desired articles from said dough and drying the same preparatory to finishing and polishing.

2. A wood substitute consisting of flour from cereals, fibrous material and an alkaline silicate.

3. A wood substitute consisting of flour from cereals, wood-dust, fibrous materials and an alkaline silicate.

4. A wood substitute consisting of flour from cereals, vegetable and animal fiber, and water-glass.

5. A wood substitute comprising about forty per cent. flour from cereals, forty per cent. vegetable fiber, two per cent. animal-hair and eighteen per cent. water-glass.

In testimony whereof I have hereunto set my hand in presence of two subscribing witnesses.

FRANZ SCHNELL.

Witnesses:
    JOSEF RUBARCHE,
    ALVESTO S. HOGUE.